United States Patent [19]
Goins et al.

[11] Patent Number: 5,520,209
[45] Date of Patent: May 28, 1996

[54] FLUID RELIEF DEVICE

[75] Inventors: James R. Goins; John W. Ogle; James R. Ogle, all of Lake Jackson, Tex.

[73] Assignee: The Dow Chemical Company, Midland, Mich.

[21] Appl. No.: 162,729

[22] Filed: Dec. 3, 1993

[51] Int. Cl.$^6$ .................... F16K 24/04; F16K 37/00; F16K 51/00
[52] U.S. Cl. .................... 137/246; 73/23.2; 73/49.2; 137/246.22; 137/312; 137/469; 137/534; 137/557; 220/203.01; 220/203.29
[58] Field of Search .................... 137/240, 246, 137/557, 246.22, 312, 469, 526, 532, 534; 220/204, 205, 225, 203.01, 203.29; 73/23.2, 23.21, 49.2, 49.3

[56] References Cited

U.S. PATENT DOCUMENTS

| | | | |
|---|---|---|---|
| 1,826,941 | 10/1931 | La Mont | 137/246.22 |
| 2,918,938 | 12/1959 | Kimball | 137/246.22 |
| 3,100,502 | 8/1963 | Ford et al. | 137/469 |
| 3,175,566 | 3/1965 | Daniels | 137/246 |
| 3,217,082 | 11/1965 | King et al. | 137/469 |
| 3,426,581 | 2/1969 | Briggs | 137/246.22 |
| 3,665,952 | 5/1972 | Chronister | 137/246 |
| 3,713,461 | 1/1973 | Notelteirs | 137/246 |
| 3,848,765 | 11/1974 | Durkop | 220/9 A |
| 3,902,356 | 9/1975 | Rupf-Bolz | 73/49.2 |
| 4,091,837 | 5/1978 | Edmunds et al. | 137/469 |
| 4,144,902 | 3/1979 | Mahr et al. | 137/246.22 |
| 4,188,174 | 2/1980 | Perkins | 137/246.22 |
| 4,431,161 | 2/1984 | Miller et al. | 137/246 |
| 4,444,219 | 4/1984 | Hollenstein | 137/246 |
| 4,478,178 | 10/1984 | Pernet | 123/41.01 |
| 4,676,266 | 6/1987 | Johnson | 137/469 |
| 4,912,966 | 4/1990 | Sharp | 73/49.2 |
| 5,046,354 | 9/1991 | Munguia et al. | 73/49.2 |
| 5,048,555 | 9/1991 | Mieth et al. | 137/246 |
| 5,203,372 | 4/1993 | Freiler | 137/469 |
| 5,249,593 | 10/1993 | Higgins et al. | 137/12 |

FOREIGN PATENT DOCUMENTS 3933265  10/1989  Germany.

*Primary Examiner*—George L. Walton

[57] ABSTRACT

The present invention discloses a fluid relief device for relieving pressure of a fluid stored in a container or tank, or fluid used in a piece of equipment. In one aspect such a device has a body member with a primary channel therethrough in communication with a container of a contained fluid under pressure. When the pressure of the contained fluid under pressure exceeds a predetermined level, the pressure of the contained fluid moves a cover which is sealingly in place to close off the primary channel. During normal conditions the force of the contained fluid is insufficient to move the cover and leakage of the contained fluid past the cover is inhibited by the provision of a barrier fluid supplied into a barrier fluid chamber to oppose the contained fluid, the barrier fluid at a pressure greater than the normal pressure of the contained fluid. Seals may be provided on one or two sides of the barrier fluid chamber—a first seal to seal the primary channel-chamber interface and a second seal to seal the chamber-exterior interface. Fluid under pressure supplied to the chamber may leak past the first seal into the container. In one aspect an inert barrier fluid, e.g. nitrogen is used. Devices according to this invention may be used with pressure relief devices and vacuum relief devices.

24 Claims, 2 Drawing Sheets

5,520,209

1

FLUID RELIEF DEVICE

BACKGROUND OF THE INVENTION

1. Field of the Invention

This invention is related to relief devices, including pressure relief devices and vacuum relief devices; to equipment or storage tanks with fluid therein under pressure with such devices; and, in one particular aspect to a gas relief device in which a fluid under pressure opposes pressure of a stored fluid to inhibit leakage of the stored fluid.

2. Description of Related Art

Fluid relief devices are widely used to prevent undesirable over or under pressures (excess or insufficient) of fluid stored in storage tanks or in other equipment when abnormal conditions exist. During normal operating or storage conditions, a weight or other method of loading typically forces a cover against a seal to prevent fluid under pressure in the storage tank or equipment from escaping through the relief device. An environmental concern with these devices is that there is typically an amount of leakage of the stored or contained fluid through or past the relief device seal even under normal conditions.

The prior art discloses a variety of storage systems and leakage detectors. U.S. Pat. No. 4,912,966 discloses a storage tank system and an inner tank, an outer jacket, an air pressure or vacuum means located in the space between the inner tank and the outer jacket. Leak detection apparatus is provided.

U.S. Pat. No. 3,902,356 discloses a storage tank having a bottom, a separating bottom, gas-filled space between the bottom and the separating bottom, and a differential pressure leakage indicator gauge.

U.S. Pat. No. 4,478,178 discloses an enclosure having spaced pressure relief valves, and a gas-filled chamber positioned between the two relief valves.

U.S. Pat. No. 5,046,354 discloses a pressurized storage tank having a shut-down valve assembly.

U.S. Pat. No. 3,848,765 discloses a double-walled tank and means for ascertaining when any liquid enters the space between an inner tank and an outer tank.

German Patent 3,933,265 discloses a leakage detection system for a multiple-walled pressure container.

SUMMARY OF THE PRESENT INVENTION

The present invention, in one embodiment, discloses a pressure relief device for use on a container containing a process fluid under pressure. The pressure relief device has a body with a primary channel in fluid communication with the container's interior. The primary channel has an open end from which process fluid may flow from the primary channel to an exit port. A movable cover over the open end of the primary channel closes off process fluid flow from the container's interior to the exit port. When the pressure of the process fluid exceeds a certain predetermined level, the force of the process fluid moves the cover permitting process fluid to exit the container through the exit port. Dual spaced-apart seals between the cover and body seal the cover-body interface. A chamber is provided between the two seals for receiving through a barrier fluid inlet a barrier fluid under pressure. A first seal of the two opposed seals seals the primary channel-cover interface. The leakage path of process fluid, should it occur, would be through the primary channel, past the first seal, into the chamber, and out through the inlet port. This type of leakage is prevented by applying the barrier fluid to the chamber at a pressure greater than the pressure of the process fluid. Thus, either no fluid flows either way past the first seal or barrier fluid flows into the container since it is at a higher pressure than the pressure of the process fluid. Barrier fluid may exit the chamber through a barrier fluid exit port.

In one embodiment of such a pressure relief device, the barrier fluid is preferably at a pressure only slightly higher than that of the process fluid. In certain embodiments the barrier fluid is gas, in other embodiments it is liquid. In another embodiment, the pressure in the chamber between the two seals is kept at a pressure less than the pressure in the primary channel of the relief device. In this case, leakage occurs into the chamber between the seals both from the container past the first seal and from the exterior of the device past the second seal. The leaked fluid collected in the chamber is conveyed to a control device to prevent emissions. Various instrumentation is used to detect and alarm conditions when the seals are leaking in excess of a predetermined level or when there is a failure of the barrier fluid system.

In one embodiment of this invention, a barrier fluid under vacuum is used and leakage at seals is detected by, e.g., continuously monitoring vacuum supply pressure (a leak being indicated by a decrease in vacuum level), or by analyzing fluid for the presence of air or of vapors/gas from a storage tank. When a vacuum relief device is employed on a storage tank, a barrier fluid prevents leakage of vapors from the tank. The tank is normally under positive pressure. The vacuum relief device opens when pressure in the tank becomes less by a predetermined amount than a pre-set pressure, e.g. atmospheric pressure. In the case of equipment that operates normally at less than atmospheric pressure, embodiments of this invention prevent air from leaking through the relief device into a protected tank or pipe.

In one typical embodiment, a pressure relief device according to this invention is used on a storage tank containing, e.g. a hydrocarbon mixture from which benzene and other gases evolve into the space at the top of the tank. The pressure relief device protects the tank from over pressure in the event of abnormal conditions of rising pressure by opening before the pressure in the tank reaches a level that could damage the tank. In this example, the pressure relieve device opens at 1 P.S.I.G. During normal operations, a pressure control device on the tank maintains gas pressure in the tank at about 0.5 P.S.I.G. (pounds per square inch gauge), typically providing an input of a gas (e.g. nitrogen or methane) to the tank's interior if pressure in the tank is too low or providing for venting of built up gas if an overpressure occurs.

An inert gas such as nitrogen is supplied to the chamber between the dual opposed seals at a pressure of about one and one tenth pound, i.e., at an incremental amount (0.6 P.S.I.G) greater than the maximum normal pressure of the vapor in the top of the tank. Alternately, the pressure in the barrier chamber may be regulated to vary with the tank pressure but always at an incremental amount above the tank pressure. Therefore, leakage through the pressure relief device is inwardly; i.e., if leakage occurs, nitrogen leaks past the first seal into the tank's interior. The pressure relief device protects the tank from an overpressure, e.g. in one instance if the pressure in the tank reaches 1 P.S.I.G.

It is, therefore, an object of at least certain preferred embodiments of the present invention to provide:

New, useful, unique, efficient, non-obvious devices for relief of fluids under pressure and equipment or storage containers with such devices;

Such devices in which a barrier fluid is provided at a leakage point to oppose a contained fluid; preferably, in certain embodiments the barrier fluid is at a higher pressure than the pressure of the contained fluid, and preferably only minimally incrementally different, e.g. one p.s.i.g. or less; and in other embodiments the barrier fluid is at a pressure lower than atmospheric pressure, and preferably only incrementally different, e.g. only one p.s.i.g. or less.

Such devices in which the barrier fluid is an inert gas;

Such devices in which with respect to any lifting force, or force opposing lifting of a cover member, the effect of the barrier fluid is negligible so that the barrier fluid produces substantially no movement of a primary cover in the relief device and does not substantially alter the pressure at which the device is designed to operate;

Such devices in which any lifting force or force opposing lifting or effect of the barrier fluid is negligible so that the barrier fluid produces substantially no movement of a primary cover in the relief device and does not substantially alter the way in which the device functions to relief abnormal pressure;

Such devices in which the barrier fluid is maintained at a pressure lower than (preferably only incrementally lower than) atmospheric pressure in a chamber between seals and is maintained below the pressure of a contained (and potentially leaking) fluid so that leaking fluid may be collected in the chamber for transmission to appropriate venting and/or treatment apparatus rather than to the environment;

Such devices with detection and/or alarm instrumentation; and

Equipment or storage containers with any such device.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention should be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

DESCRIPTION OF EMBODIMENTS PREFERRED AT THE TIME OF FILING FOR THIS PATENT

Figure 1:
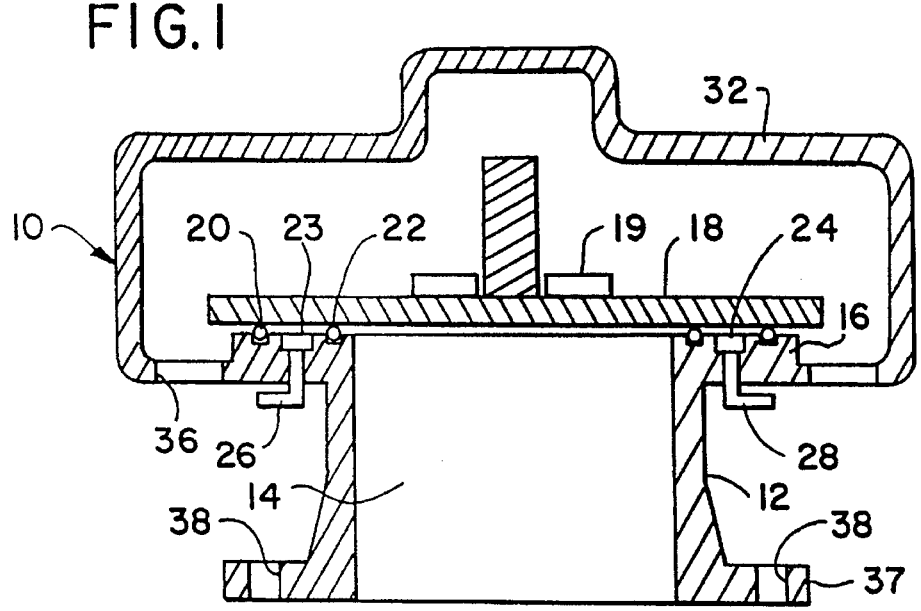
FIG. 1 is a side cross-sectional view of a device according to the present invention.
Figure 2:
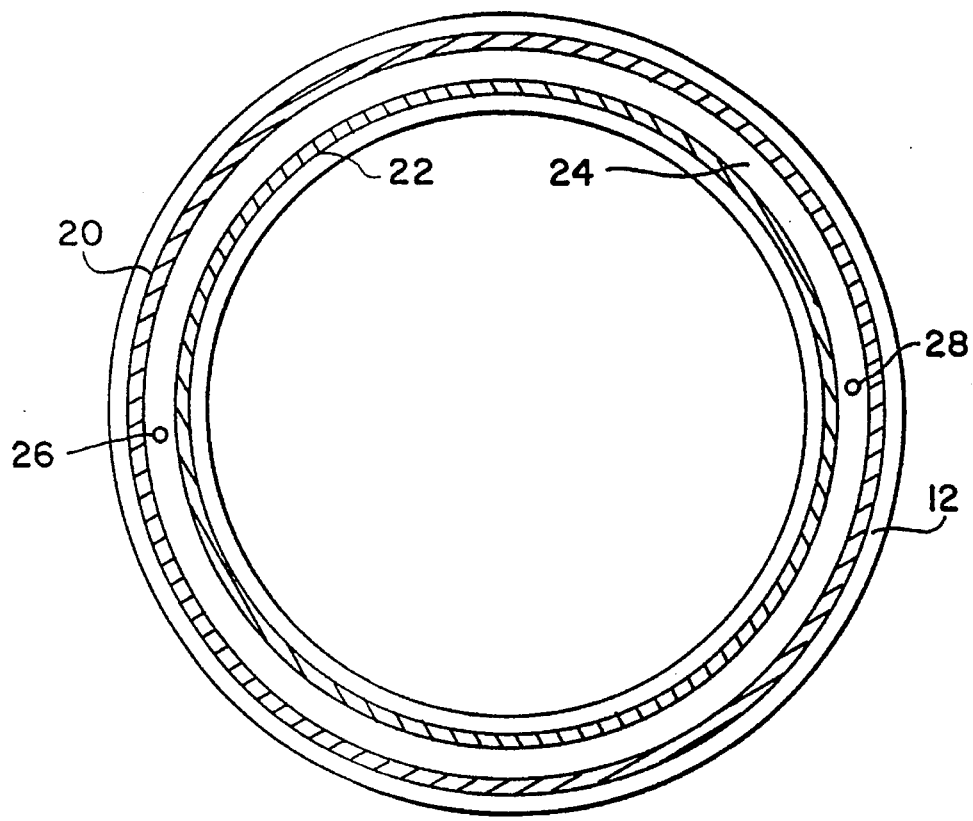
FIG. 2 is a top view of the device of FIG. 1.

Referring now to FIGS. 1 and 2, a fluid relief device 10 according to the present invention has a body 12 with a primary relief channel 14 therethrough. The body 12 can be secured to a piece of equipment that uses fluid under pressure or to a storage tank (not shown) e.g. by bolts (not shown) through bolt holes 38 in a lower flange 37 of the body 12 so that fluid contained in the tank or equipment flows into the primary channel 14.

A cover 18 over an end of the body 12 sealingly abuts an end flange 16 of the body 12 and two concentric seals 20 and 22. Additional seals may be used within the scope of this invention. A weight 19 may be used so that the weight of the cover 18 plus the weight 19 maintains the cover 18 sealingly across the channel 14 when pressure of the contained fluid is at a normal level. When pressure exceeds the normal level, the force of the contained fluid lifts the cover 18 and the contained fluid escapes from its container through a vent port 36 in a top 32 of the body 12. The top 32 encloses and protects the cover 18.

A barrier fluid chamber 24 is disposed between the two seals 20 and 22. A barrier fluid (including but not limited to a liquid, an inert gas such as nitrogen, or a gas such as methane) is supplied through an inlet 26 to the barrier fluid chamber 24, preferably at a pressure slightly higher than the pressure of the contained fluid within the tank or equipment. Thus the barrier fluid fills the chamber and a space 23 between the seals 20 and 22 so that if there is a leakage path at or around the seal 20, barrier fluid flows into the primary channel 14 (and then to any interconnected intercommunicating tank or equipment) rather than contained fluid leaking past the seal. The barrier fluid may be vented through an exit port 28 which intercommunicates with the barrier fluid chamber 24.

Figure 3:
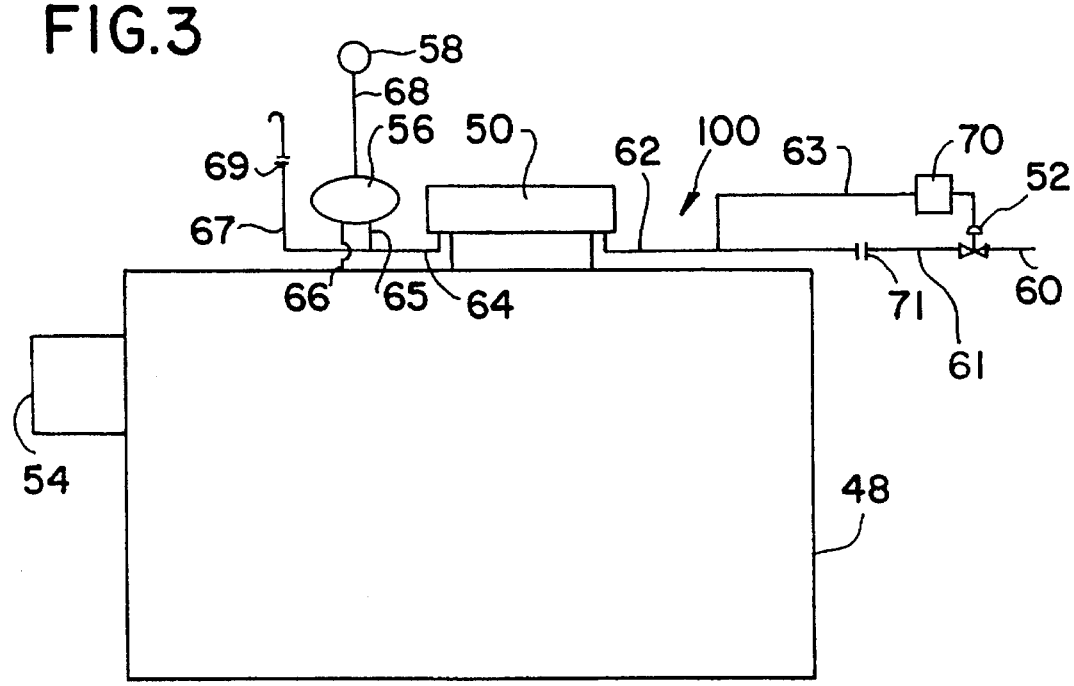
FIG. 3 is a schematic view of a system according to the present invention.

FIG. 3 illustrates a system 100 according to the present invention with a relief device 50 according to the present invention. The relief device 50 is like the relief device 10. Nitrogen is supplied to a barrier fluid chamber in the device 50 at about 1.1 pounds pressure. Fluid under pressure (e.g. at 0.5 P.S.I.G. in a tank 48 flows through a primary channel in the device 50 at about 0.5 P.S.I.G.) in a tank 48 flows through a primary channel in the device 50 at about 0.5 P.S.I.G. and is prevented from exiting the device 50 by a cover such as the cover 18, FIG. 1. A typical pressure control apparatus 54 maintains pressure in the tank 48 (or pressure of gas in the top of the tank?) at the level of about 0.5 P.S.I.G. In the event of a slight overpressure (i.e. insufficient to lift a cover in the device 50) the apparatus 54 decreases pressure in the tank 48; e.g. by venting to a control device and/or treatment device (e.g. flare scrubbing system, etc.), and or recovery device; and in the event of slight underpressure, the apparatus 54 increases pressure in the tank 48 by pumping fluid or a pad gas (e.g. but not limited to nitrogen) above liquid in the tank.

A differential pressure switch 56 monitors both the pressure of nitrogen in the barrier fluid chamber of the device 50 via lines 64 and 65 and the pressure of fluid contained in the tank 48 via a line 66. Abnormal leakage from either of the seals of the barrier fluid chamber of the device 50 produces a signal corresponding to an undesirable pressure differential. This signal may be transmitted to a computer monitoring system, recorder, or process monitor or to a differential pressure alarm 58. The alarm may be an audio and/or visual alarm which indicates an abnormal pressure.

Nitrogen pressure between a first seal (not shown, like the seal 20, FIG. 1) and between a second seal (not shown, like the seal 22, FIG. 1) is maintained by using an appropriate limiting orifice 69 in the line 67 (a purge line vented to atmosphere, or to a control device or treatment apparatus or for recovery and return to the tank) and by appropriate setting of a control valve 52 of a pressure regulator system 70 in the nitrogen input line 60. The limiting orifice's flow may be set to slightly above zero or zero to provide better overall control of the barrier fluid pressure.

A pressure signal is provided to the system 70 via the line 63. In the event either seal begins to fail, nitrogen flow increases through the first seal into the tank 48 or past the second seal to the atmosphere. A limiting orifice 71 in the line 61 limits nitrogen flow to some predetermined maximum. If the leakage rate exceeds this maximum, a decrease in barrier fluid differential pressure is detected and alarmed by the differential pressure alarm 58 indicating seal failure or loss of barrier fluid.

Any barrier fluid may be used which is compatible with a contained or stored fluid. Preferably the lifting force of a barrier fluid is no more than fifteen percent of the lifting force supplied by the contained fluid, and is most preferably no greater than three percent of the contained fluid's lifting force. The seals (e.g. seals 20 and 22) may be any appropriate sealing members, surfaces, gaskets, o-rings, or metal pieces or members so that a barrier fluid chamber has two sealed flow paths or ports. By utilizing limiting orifices, the necessary amount of the barrier fluid is minimized and waste of barrier fluid is minimized, although sufficient barrier fluid is used to oppose the contained fluid and to activate the differential pressure switch 56.

Figure 4:
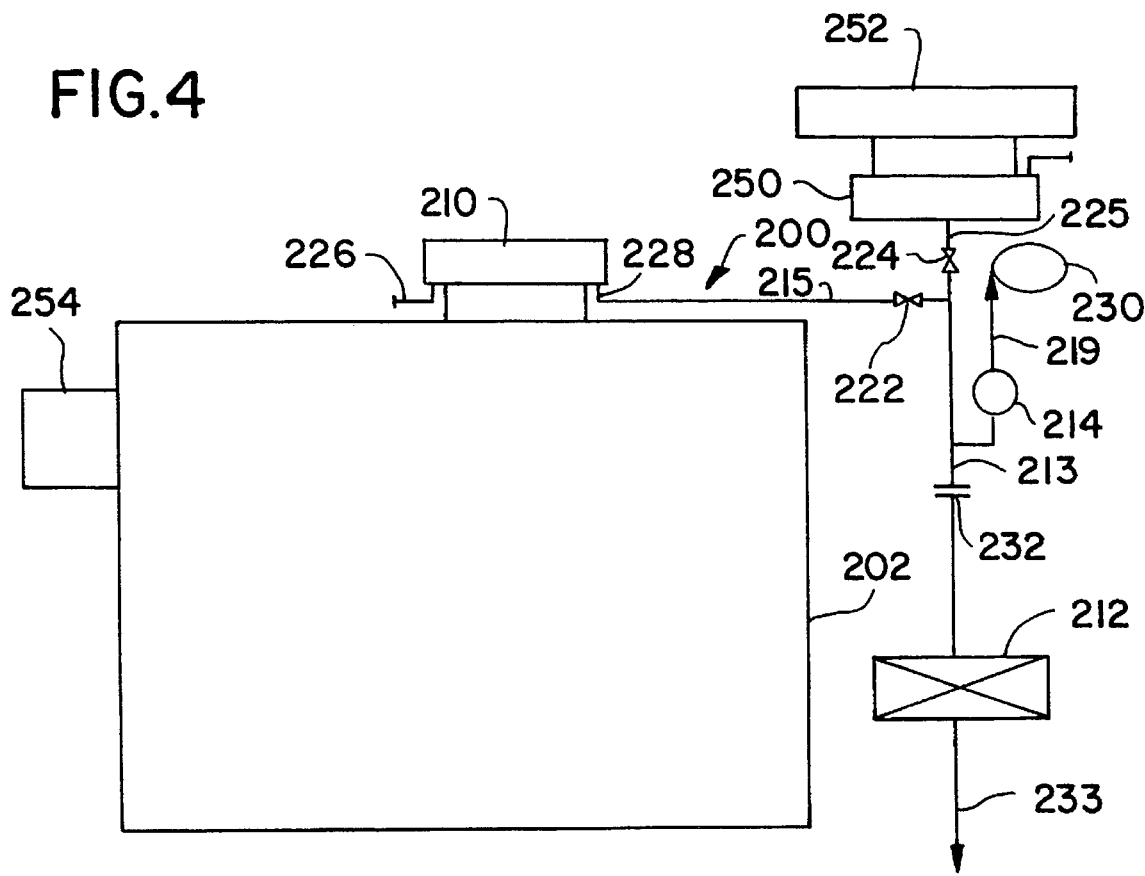
FIG. 4 is a schematic view of a system according to the present invention.

Referring now to FIG. 4, a system 200 according to the present invention includes a fluid storage vessel 202 with a pressure control apparatus 254 as previously described for the system 100's (FIG. 3) control apparatus 54. A fluid relief device 210 is like the previously described fluid relief device 10, but one of its two ports is blocked off to flow or only one port is provided (e.g. with a device such as the device 10 the inlet 26 is closed to flow and the exit port 28 is used). A vacuum is applied to a port 228 by a vacuum apparatus 212. An inlet port 226 is closed to flow.

The vacuum apparatus 212 (e.g. a vacuum pump or ejector) provides a known vacuum level through the lines 213 and 215 to the port 228. A pressure transmitter apparatus 214 measures the vacuum level and produces a signal indicative of that level which is transmitted through a line 219 to control and/or alarm apparatus such as a computer monitoring/alarm system 230. The apparatus 214 may also include gas analyzing apparatus for analyzing the gas provided to the apparatus 214. If gas other than the barrier fluid is detected, an alarm may be signalled. A valve 222 controls flow in the line 215 and a valve 224 controls flow in a line 225 which is connected to another fluid relief device 210 (not shown) on another storage vessel (not shown). A leak from the storage vessel 202 into the device 210 and past a barrier seal therein will result in the pressure transmitter apparatus 214 sensing a lower vacuum level and signalling the computer monitoring/alarm system 230.

The valves 222 and 224 are used to isolate each of a plurality of relief devices (one shown, item 250, according to the present invention and like the previously described relief devices) and their associated storage vessels (one shown, the vessel 252) when a plurality of vessels are interconnected with a single pressure transmitter apparatus 214. A limiting orifice 232 in the line limits flow through the line 213. Material flowing through the line 213 to the vacuum apparatus 212 (e.g. any leakage from the storage vessel 202 past the inner seal, or any leakage from the atmosphere past an outer seal flows into the relief device's barrier chamber and is drawn into the flow lines and to the vacuum apparatus 212) is vented from the vacuum apparatus 212 in a vent line 233.

In conclusion, therefore, it is seen that the present invention and the embodiments disclosed herein and those covered by the appended claims are well adapted to carry out the objectives and obtain the ends set forth. Certain changes can be made in the subject matter described, shown and claimed without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form its principles may be utilized.

What is claimed is:

1. A fluid pressure relief device for a container adapted to contain fluid at a normal fluid pressure, the fluid pressure relief device openable in response to a predetermined pressure level of fluid in an interior space within the container, the fluid pressure relief device comprising a body with a primary channel therethrough for escape of fluid from the container, the primary channel disposable in fluid communication with the interior space of the container, a cover movably disposed over the primary channel and movable by force of the fluid within the interior space of the container when it reaches a predetermined escape pressure greater than the normal fluid pressure, the cover movable apart from the body and away from the primary channel by said force of the fluid thereby permitting escape of fluid from the interior space of the container through the primary channel, at least two seals between the body and the cover for sealing therebetween, a barrier fluid chamber formed between the at least two seals, and a chamber inlet for supplying a barrier fluid to the barrier fluid chamber at a pressure different from the normal fluid pressure.

2. The fluid pressure relief device of claim 1 including a barrier fluid in the barrier fluid chamber at a pressure greater than the normal fluid pressure and wherein the barrier fluid prevents outflow of the contained fluid past the seals while the contained fluid is at the normal fluid pressure.

3. The fluid pressure relief device of claim 1 including a barrier fluid in the barrier fluid chamber at a pressure less than the normal fluid pressure.

4. The fluid pressure relief device of claim 1 further comprising also a containment member housing the cover and in which the cover is movable, the containment member having at least one fluid port open for escape of contained fluid out from the containment member.

5. The fluid pressure relief device of claim 1 including an inert barrier fluid in the barrier fluid chamber.

6. The fluid pressure relief device of claim 5 including a barrier fluid in the barrier fluid chamber and the barrier fluid is nitrogen.

7. The fluid pressure relief device of claim 1 including a barrier fluid in the barrier fluid chamber and the barrier fluid is chemically non-reactive with the contained fluid.

8. The fluid pressure relief device of claim 1 further comprising a barrier fluid in the barrier fluid chamber, and the barrier fluid is liquid.

9. The fluid pressure relief device of claim 1 further comprising fluid flow limiting apparatus for limiting the amount of barrier fluid supplied to the barrier fluid chamber.

10. The fluid pressure relief device of claim 1 further comprising control monitor apparatus for monitoring pressure of the contained fluid in the container, for monitoring pressure of barrier fluid in the barrier fluid chamber, and for controlling pressure of contained fluid and of barrier fluid.

11. The fluid pressure relief device of claim 48 wherein the control monitor apparatus includes alarm apparatus for presenting an alarm when the barrier fluid pressure changes a set amount from a pre-set baseline pressure.

12. The fluid pressure relief device of claim 3 further comprising vacuum apparatus for supplying a vacuum on the barrier fluid chamber to maintain barrier fluid pressure below that of the contained fluid.

13. The fluid pressure relief device of claim 12 further comprising vent apparatus interconnected with the vacuum apparatus to vent from the vacuum apparatus fluid flowing to the vacuum apparatus from the fluid relief device and from the container.

14. The fluid pressure relief device of claim 3 wherein the barrier fluid pressure is maintained by a pressure control device at about 0.1 P.S.I.G. lower than the contained fluid pressure.

15. The fluid pressure relief device of claim 2 wherein the barrier fluid pressure is maintained by a pressure control device at about 0.1 P.S.I.G. greater than the contained fluid pressure.

16. The fluid pressure relief device of claim 1 wherein the container fluid is a first gas and the barrier fluid is a second gas different from the first gas, the device further comprising gas analyzer means for analyzing gas from the barrier fluid chamber, and transmission means for transmitting gas from the barrier fluid chamber to the gas analyzer means.

17. A sealing system for sealing an interface between a fluid pressure relief device's movable cover and a body with a primary channel therethrough for escape of contained fluid from a container on which the fluid relief device is mounted, the fluid pressure relief device openable in response to a predetermined pressure level of contained fluid in an interior space of the container, the contained fluid initially at a normal fluid pressure, the cover movable apart from the body and away from the primary channel by the force of fluid within the interior space of the container that attains a pressure greater than the normal pressure, thereby permitting escape of contained fluid from the interior space of the container through the primary channel, the sealing system comprising a first seal between the body and the cover and encompassing an opening of the primary channel of the body, a second seal between the body and the cover and spaced apart from the first seal, and the second seal encompassing the first seal, a barrier fluid chamber between the first and second seals, and a barrier fluid under pressure within the barrier fluid chamber.

18. The sealing system of claim 17 wherein the barrier fluid is at a pressure greater than the pressure of the contained fluid.

19. The sealing system of claim 17 wherein the barrier fluid is at a pressure lower than the pressure of the contained fluid.

20. A fluid pressure relief device for a container adapted to contain fluid at a normal fluid pressure, the device comprising a body with a primary channel therethrough for escape of fluid from the container, a cover movably disposed over the primary channel and movable by force of the fluid when it reaches a predetermined escape pressure greater than the normal fluid pressure, the cover movable apart from the body and away from the primary channel by said force of the fluid thereby permitting escape of fluid from the container through the primary channel, at least two seals between the body and the cover for sealing therebetween, a barrier fluid chamber formed between the at least two seals, a chamber inlet for supplying a barrier fluid to the barrier fluid chamber at a pressure different from the normal fluid pressure, and control monitor apparatus for monitoring pressure of the contained fluid in the container, for monitoring pressure of barrier fluid in the barrier fluid chamber, and for controlling pressure of contained fluid and of barrier fluid.

21. The fluid pressure relief device of claim 20 wherein the control monitor apparatus includes alarm apparatus for presenting an alarm when the barrier fluid pressure changes a set amount from a pre-set baseline pressure.

22. A fluid pressure relief device for a container adapted to contain fluid at a normal fluid pressure, the device comprising a body with a primary channel therethrough for escape of fluid from the container, a cover movably disposed over the primary channel and movable by force of the fluid when it reaches a predetermined escape pressure greater than the normal fluid pressure, the cover movable apart from the body and away from the primary channel by said force of the fluid thereby permitting escape of fluid from the container through the primary channel, at least two seals between the body and the cover for sealing therebetween, a barrier fluid chamber formed between the at least two seals, a chamber inlet for supplying a barrier fluid to the barrier fluid chamber at a pressure different from the normal fluid pressure, a barrier fluid in the barrier fluid chamber at a pressure less than the normal fluid pressure, and vacuum apparatus for supplying a vacuum on the barrier fluid chamber to maintain barrier fluid pressure below that of the contained fluid.

23. The fluid pressure relief device of claim 22 further comprising vent apparatus interconnected with the vacuum apparatus to vent from the vacuum apparatus fluid flowing to the vacuum apparatus from the fluid relief device and from the container.

24. A fluid pressure relief device for a container adapted to contain fluid at a normal fluid pressure, the device comprising a body with a primary channel therethrough for escape of fluid from the container, a cover movably disposed over the primary channel and movable by force of the fluid when it reaches a predetermined escape pressure greater than the normal fluid pressure, the cover movable apart from the body and away from the primary channel by said force of the fluid thereby permitting escape of fluid from the container through the primary channel, at least two seals between the body and the cover for sealing therebetween, a barrier fluid chamber formed between the at least two seals, a chamber inlet for supplying a barrier fluid to the barrier fluid chamber at a pressure different from the normal fluid pressure, and wherein the container fluid is a first gas and the barrier fluid is a second gas different from the first gas, the device further comprising gas analyzer means for analyzing gas from the barrier fluid chamber, and transmission means for transmitting gas from the barrier fluid chamber to the gas analyzer means.

* * * * *